(12) United States Patent
Simionescu

(10) Patent No.: US 11,820,010 B1
(45) Date of Patent: Nov. 21, 2023

(54) GEARED PARALLEL MANIPULATOR OF THE SCARA TYPE

(71) Applicant: Petru Aurelian Simionescu, Corpus Christi, TX (US)

(72) Inventor: Petru Aurelian Simionescu, Corpus Christi, TX (US)

(73) Assignee: Texas A&M University Corpus Christi, Corpus Christi, TX (US)

( * ) Notice: Subject to any disclaimer, the term of this patent is extended or adjusted under 35 U.S.C. 154(b) by 0 days.

(21) Appl. No.: 17/993,878

(22) Filed: Nov. 24, 2022

(51) Int. Cl.
*B25J 9/10* (2006.01)
*B25J 9/00* (2006.01)

(52) U.S. Cl.
CPC ............... *B25J 9/009* (2013.01); *B25J 9/102* (2013.01)

(58) Field of Classification Search
CPC . B25J 9/043; B25J 9/009; F16H 19/04; F16H 19/043
See application file for complete search history.

(56) References Cited

U.S. PATENT DOCUMENTS

| | | | |
|---|---|---|---|
| 1,457,301 A | 6/1923 | Ferris et al. | |
| 4,165,583 A | 8/1979 | Meyer | |
| 4,173,845 A | 11/1979 | Heesch | |
| 4,329,111 A | 5/1982 | Schmid | |
| 4,341,502 A | 7/1982 | Makino | |
| 4,506,825 A | 3/1985 | Grant | |
| 4,559,717 A | 12/1985 | Scire et al. | |
| 4,648,785 A | 3/1987 | Nakagawa et al. | |
| 4,858,548 A | 8/1989 | Echeverria | |
| 4,946,337 A | 8/1990 | Tonai et al. | |
| 5,862,896 A | 1/1999 | Villbrandt et al. | |
| 6,082,208 A | 7/2000 | Rodgers et al. | |
| 6,215,081 B1 | 4/2001 | Jensen et al. | |
| 6,675,671 B1 | 1/2004 | Jokiel et al. | |
| 7,093,827 B2 | 8/2006 | Culpepper | |
| 7,448,094 B2 | 11/2008 | Lachance | |
| 8,567,270 B1 | 10/2013 | Pileeki | |
| 9,481,133 B2 | 11/2016 | Carbone et al. | |
| 2007/0102587 A1 | 5/2007 | Jones et al. | |
| 2021/0351662 A1* | 11/2021 | Sohn | F03G 5/086 |

FOREIGN PATENT DOCUMENTS

JP    S55112789    8/1980

OTHER PUBLICATIONS

Design of a six-axis micro-scale nanopositioner, Shih-Chi Chen et al. (Year: 2005).*
Kinematics, Workspace, Design and Accuracy Analysis of RPRPR Medical Parallel Robot, Cristian Szep et al. (Year: 2009).*
Excerpt from Handbook of Compliant Mechanisms, pp. 226, 247, 262, 265, Published by John Wiley and Sons (Year: 2013).*
English Translation of JP 55-112789 (Year: 1980).*

* cited by examiner

*Primary Examiner* — Randell J Krug

(57) ABSTRACT

A geared parallel manipulator of the SCARA type is provided that consists of a pair of motors, each driving in a controlled manner a pinion. The two pinions mesh each with a rack, said two racks being joined together via a revolute, or via a flexure hinge. The proposed parallel manipulator is simple in design and can be fabricated inexpensively of stamped sheet metal or of extruded parts. It can also be fabricated as a microelectromechanical system (MEMS) using thin film technologies.

13 Claims, 7 Drawing Sheets

US 11,820,010 B1

GEARED PARALLEL MANIPULATOR OF THE SCARA TYPE

NONPATENT LITERATURE DOCUMENTS THAT PRESENTLY APPEAR RELEVANT

Howell L. L., Magleby, S. P. and Olsen B. M. (eds.) Handbook of Compliant Mechanisms, Wiley, 2013 (pages 226, 247, 262 and 265

Chen S-C and Culpepper M. L. "Design of a six-axis micro-scale nanopositioner—μHexFlex" Precision Engineering, Vol. 30, 2006, p. 314-324. www.sciencedirect.com/science/article/pii/S0141635905001595

Szep C., Stan S-D, Csibi V., Manic M. and Balan R. "Kinematics, Workspace, Design and Accuracy Analysis of RPRPR Medical Parallel Robot," Proceedings of the $2^{nd}$ Conference on Human System Interactions, Catania, Italy, May 21-23, 2009, p. 72-77. http://ieexplore.ieee.org/xpl/articleDetails.jsp?reload=true&arnumber=5090957

Scientifica Micromanipulators, online catalog: www.scientifica.uk.com

BACKGROUND OF THE INVENTION

The present invention relates to a parallel mechanism, and in particular to a geared parallel manipulator of the SCARA type useful in industrial assembly, object manipulation, 3D printing, rapid prototyping, laser, plasma, oxyfuel or abrasive jet cutting, engraving, end milling, pen plotting etc., or as microelectromechanical system (MEMS).

Mechanisms having their links arranged in parallel have been used for some time as manipulators, assembly robots, in laser and jet cutting, or to guide extruder-heads in 3D printing machines. They have also experienced increasing use in areas like biotechnology and micro-manufacturing, where they are used to manipulate or to modify microscopic-size objects. Parallel manipulators consist of multiple links joined together using revolute joints (i.e. pin-in-hole, also known as turning joints) with at least two of them being powered joints, or combinations of revolute and prismatic (translating) joints, the latter usually occurring in the form of linear motors. Studies have also been done on replacing the revolute joints in parallel mechanisms with compliant joints, also known as flexure hinges. Compliant joints allow relative motions comparable with revolute joints, and can be monolithic with the links they connect, or can be distinct components in the form of elastic blades or rods mounted between the respective links. In terms of actual practical use, the more commonly encountered parallel manipulators are those having some degree of symmetry, as well as those having their motors mounted to the base.

The known parallel manipulators suffer however from being complicated in design. Another drawback of the known parallel manipulators is that their reduction in size is limited by the possibility of fabricating miniature revolute joints, or by the possibility of substituting pin-in-hole joints with flexure hinges of comparable motion ranges.

Advantages

An objective of this invention is to provide an improved parallel manipulator of the SCARA type which avoids the aforementioned problems, that is simple and can be fabricated inexpensively from extruded or stamped sheet metal parts. It can also be fabricated in submillimeter sizes as MEMS using thin film technologies.

These objectives are achieved in accordance with the present invention by the provision of a geared parallel manipulator of the SCARA type that consists of a pair of motors, each driving in a controlled manner one pinion. The two pinions mesh each with a rack, said two racks being joined together via a revolute joint, or via a flexure hinge.

BRIEF DESCRIPTION OF THE DRAWINGS

The present invention, together with objects and advantages thereof may be best understood by reference to the following description together with the accompanying drawings. For simplicity, in these drawings, the stationary base of the manipulator has been symbolized with three oblique, parallel lines i.e. ///.

DESCRIPTION OF THE PREFERRED EMBODIMENTS

Figure 1:
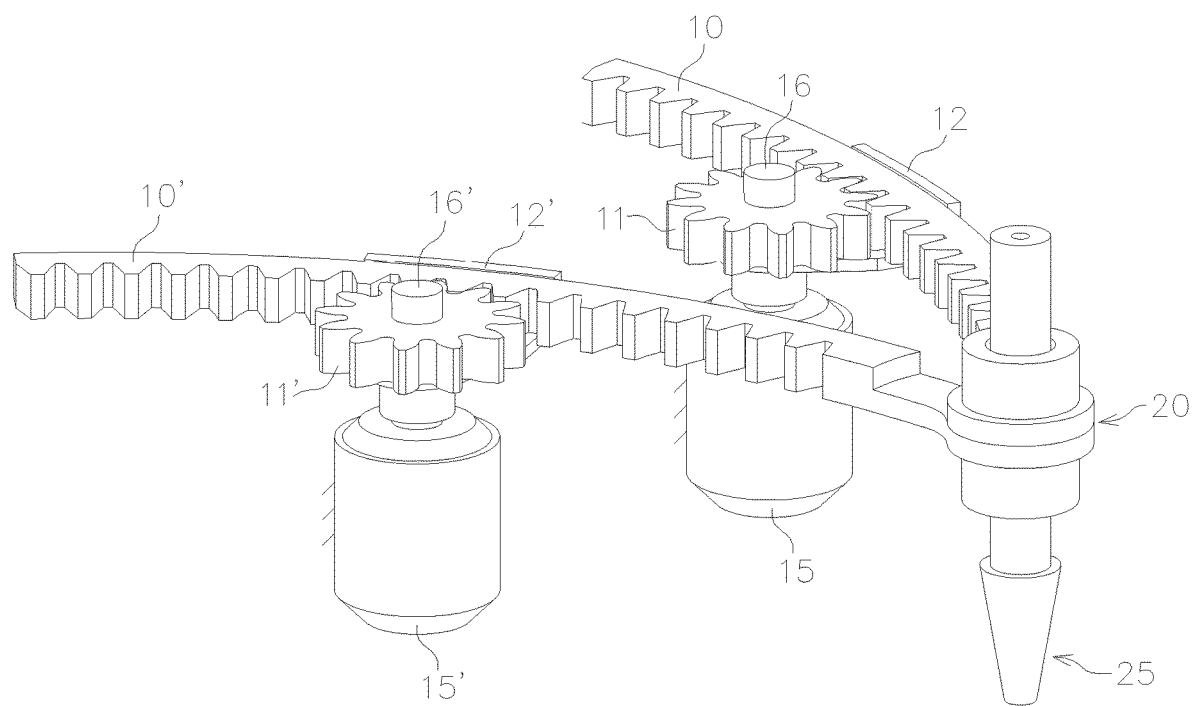
FIG. 1 is an isometric view and FIG. 2 is a top view of a geared parallel manipulator of the SCARA type that combines most elements according to the present invention.
Figure 2:
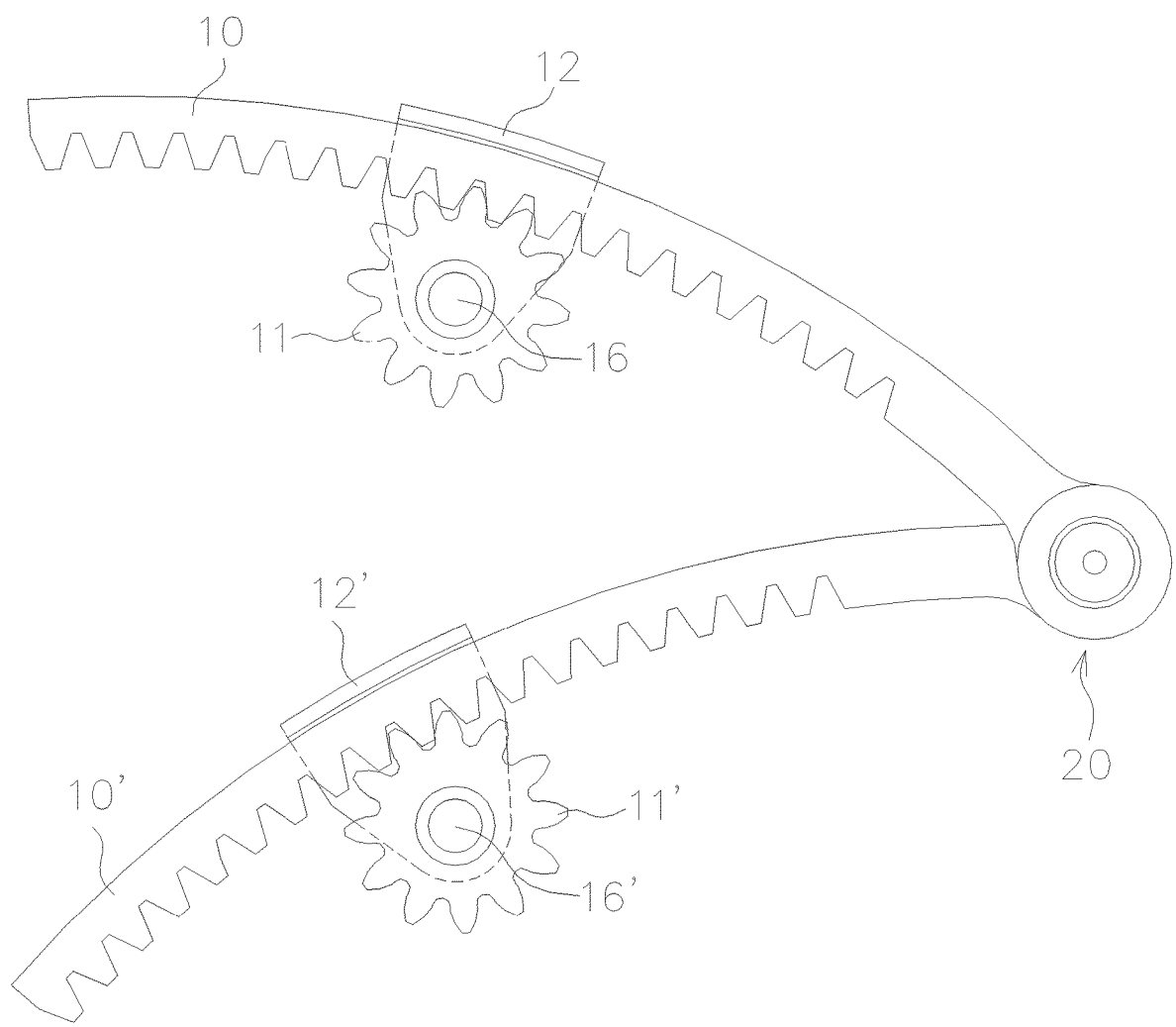

FIG. 1 and FIG. 2 show a geared parallel manipulator of the SCARA type according to the present invention consisting of two curvilinear racks 10 and 10' that are joined together via a revolute joint 20. Concentric with revolute joint 20 there is provided an end effector 25, in particular an extrusion head of the type used in 3D printing. Rack 10 meshes with a pinion 11 and the two are maintained in contact by the action of a guiding bracket 12. Similarly, rack 10' meshes with a pinion 11', and the two are hold together by a guiding bracket 12'. A pair of motors 15 and 15' (in particular servomotors or stepper motors) capable of performing controllable rotational motions, have their stators mounted to the base of the machine, while their rotor shafts 16 and 16' are rigidly assembled with pinions 11 and 11'. Guiding brackets 12 and 12' are free to pivot without the possibility of longitudinally sliding relative to the respective motor shafts 16 and 16'. Said guiding brackets serve to guide racks 10 and 10' with minimum backlash, in such a way that the pitch circles of pinions 11 and 11' remain always tangent to the pitch lines of racks 10 and 10'.

Figure 3:
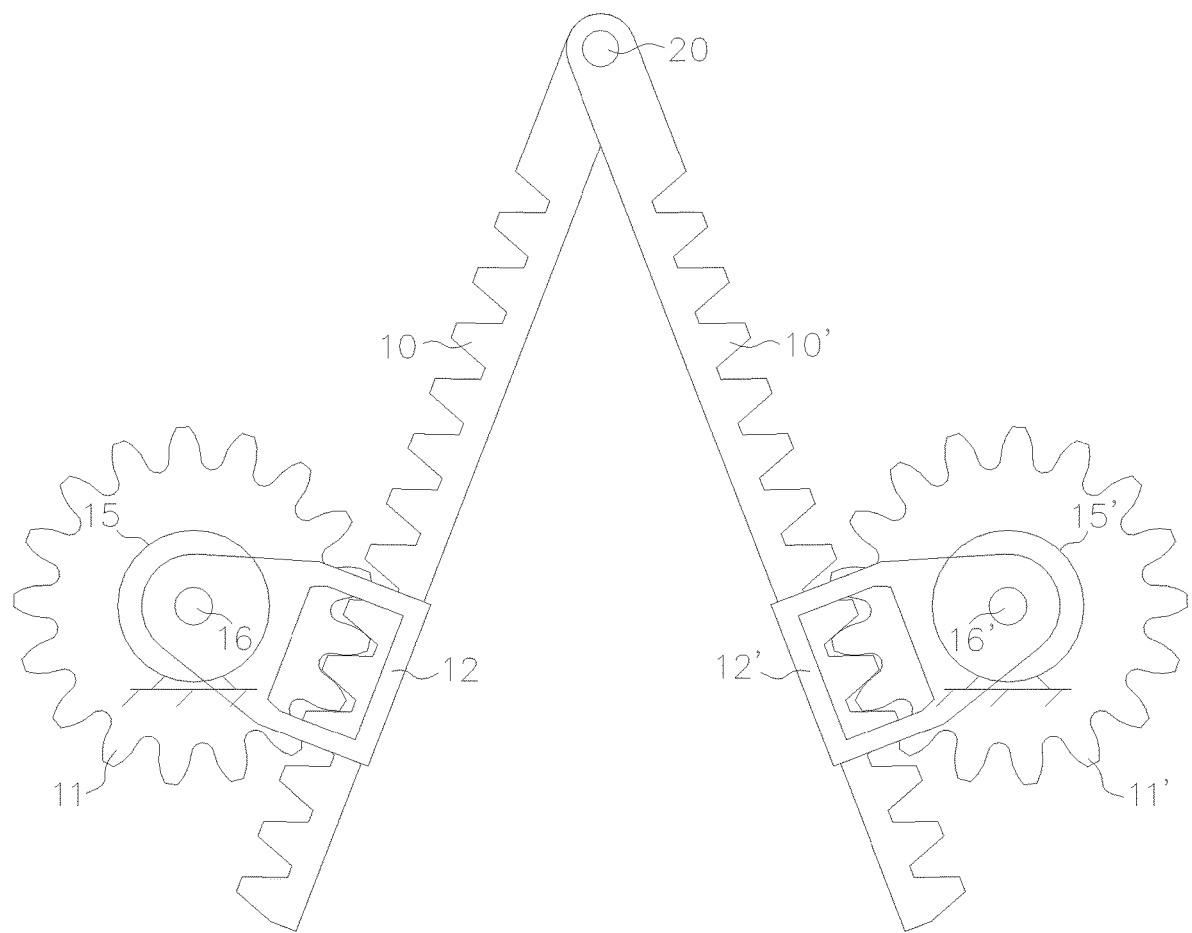
FIGS. 3, 4, 5 and 6 are top view diagrams of a geared parallel manipulator of the SCARA type according to additional embodiments of the present invention.

FIG. 3 shows a top view of another embodiment of the geared parallel manipulator of the SCARA type according to the present invention, where racks 10 and 10' are straight and, together with pinions 11 and 11', and guiding brackets 12 and 12' are arranged in a mirror configuration.

Figure 4:
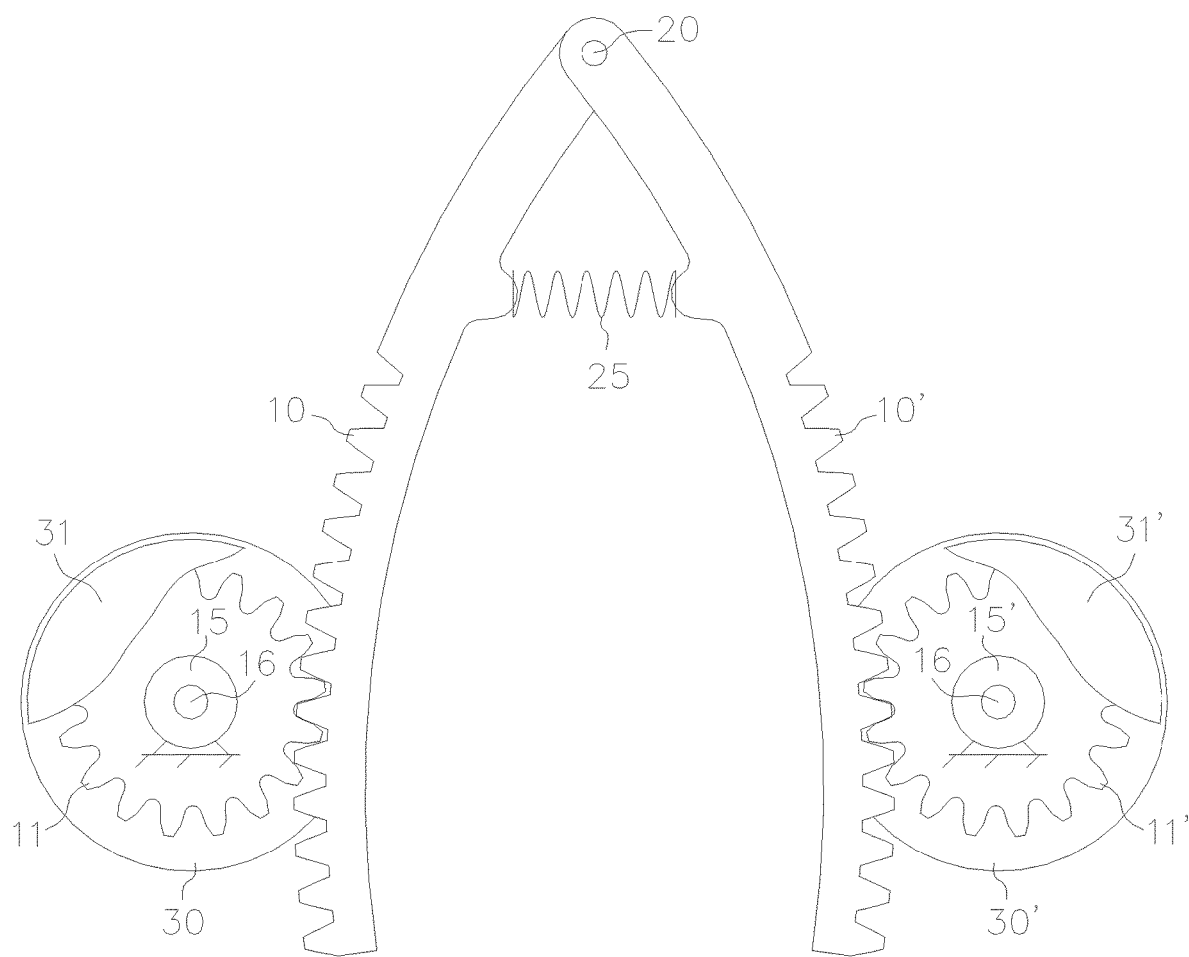

FIG. 4 shows another embodiment of the geared parallel manipulator of the SCARA type according to the present invention, where a compression spring 25 is mounted, with some amount of initial pre-compression, between racks 10 and 10', such that pinions 11 and 11' do not separate from their gear sectors as they mesh. Additionally, disk pairs 30 and 31 and disk pairs 30' and 31' are provided, one disk of the pair being mounted on one side, the other on the opposite side of the respective pinions 11 and 11' (for better visibility, disks 31 and 31' are only partially shown and have slightly smaller diameters). For the purpose of maintain racks 10 and 10' coplanar with pinions 11 and 11', the said four disks are bigger in diameter than the addendum circle of the pinion to which they are attached, and are arranged in such a way that disks 30 and 31 sandwich with minimum clearance rack 10, while disks 30' and 31' sandwich with minimum clearance rack 10'.

Figure 5:
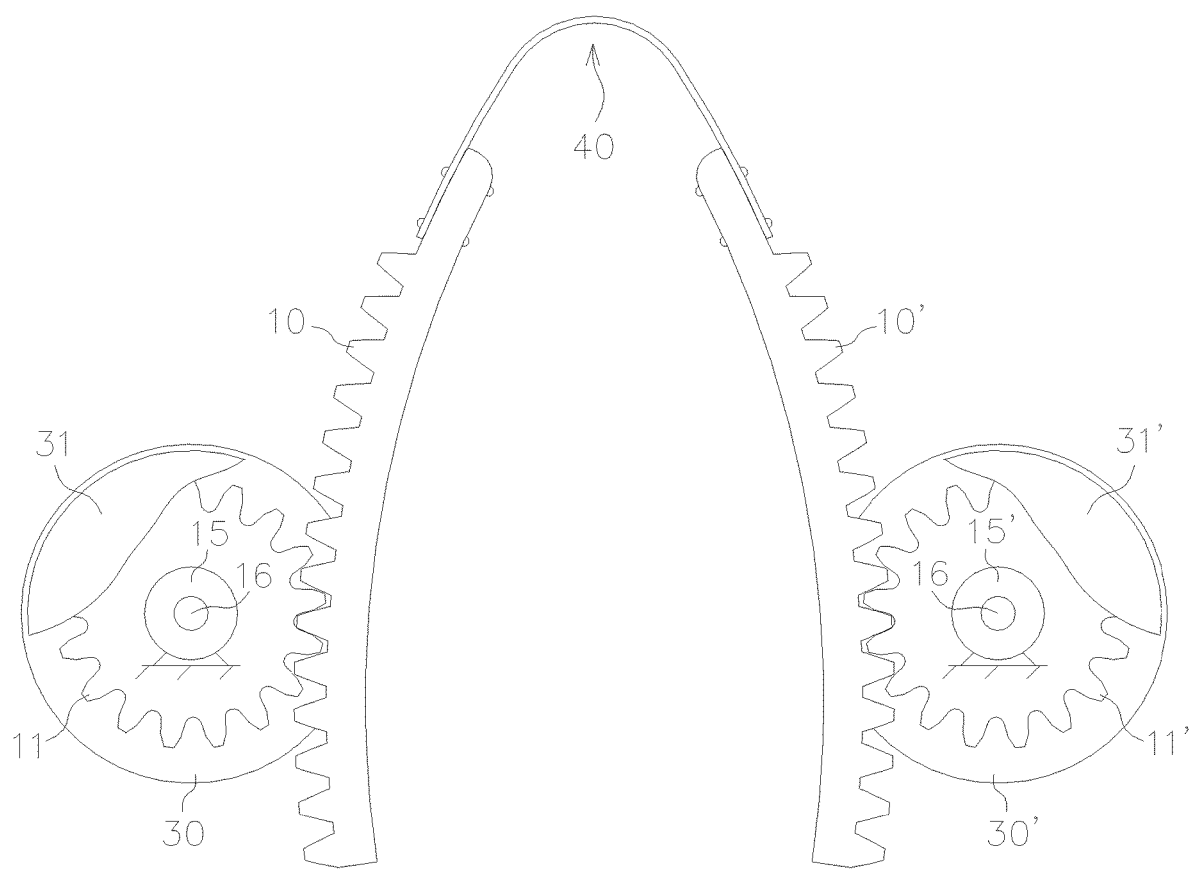

FIG. 5 shows another embodiment of the geared parallel manipulator of the SCARA type according to the present invention, where an elastic blade 40 is fastened to the ends of racks 10 and 10' such that it forms a compliant joint between said two racks. Blade 40 is preformed in order to induce a spreading action which causes racks 10 and 10' to remain in contact with their respective pinions 10 and 10'.

Figure 6:
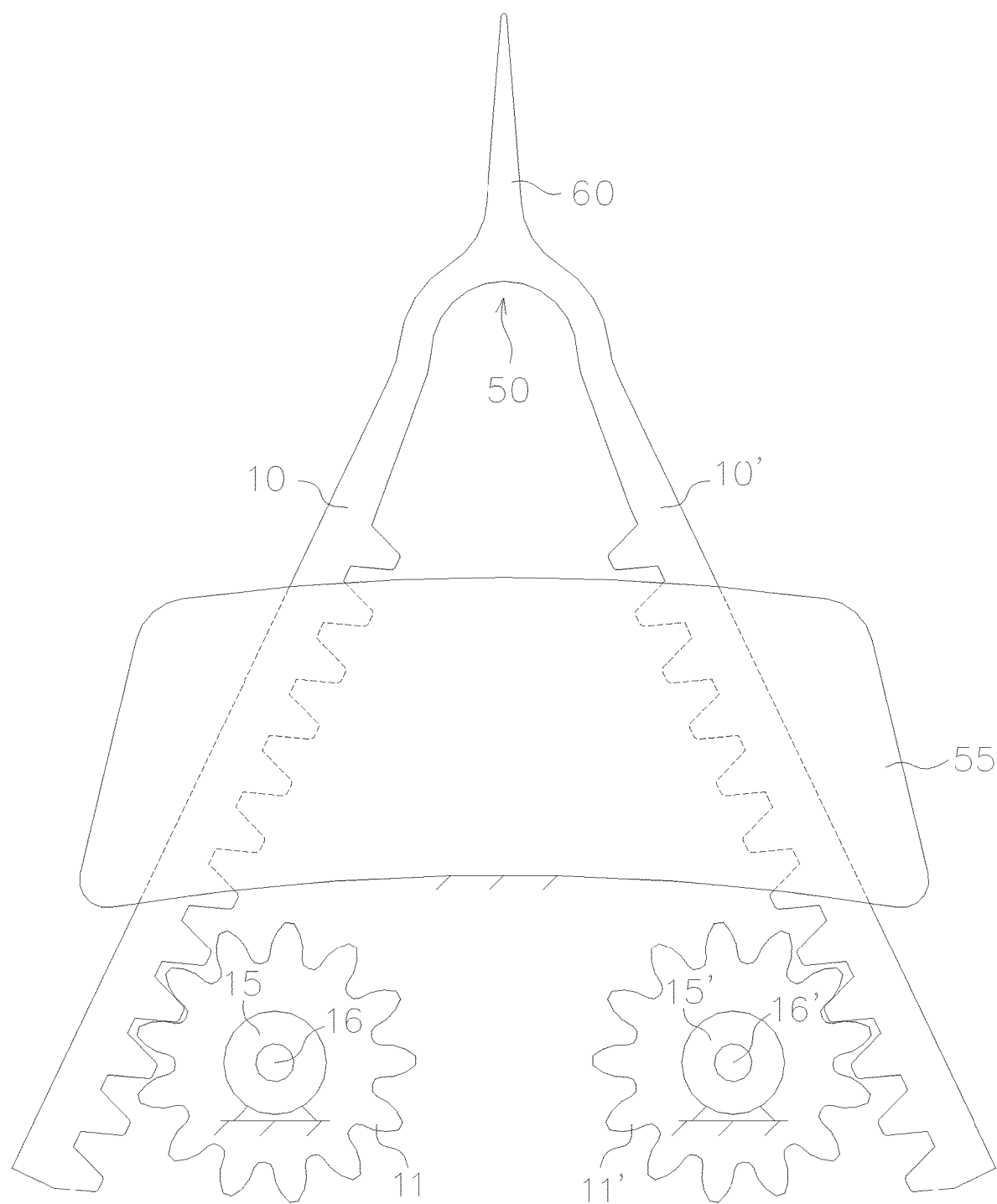

FIG. 6 shows yet another embodiment of the geared parallel manipulator of the SCARA type according to this invention, where racks 10 and 10' are joined via a monolithic flexure hinge 50. Flexure hinge 50 is preformed such that due to its own elasticity, holds in permanent contact racks 10 and 10' with their respective pinions. For the purpose of maintaining racks 10 and 10' coplanar with pinions 11 and 11', said racks are sandwiched between a flat base of the machine (not shown) and a plate 55 that is parallel with said base. A tine or prong 60 that extends from the middle portion of flexural hinge 50 is additionally provided for the purpose of better delivering a useful positioning motion by the geared parallel manipulator. In another embodiment of the present invention, prong 60 can be part of either rack 10 or 10'., and not of flexural hinge 50.

Figure 7:
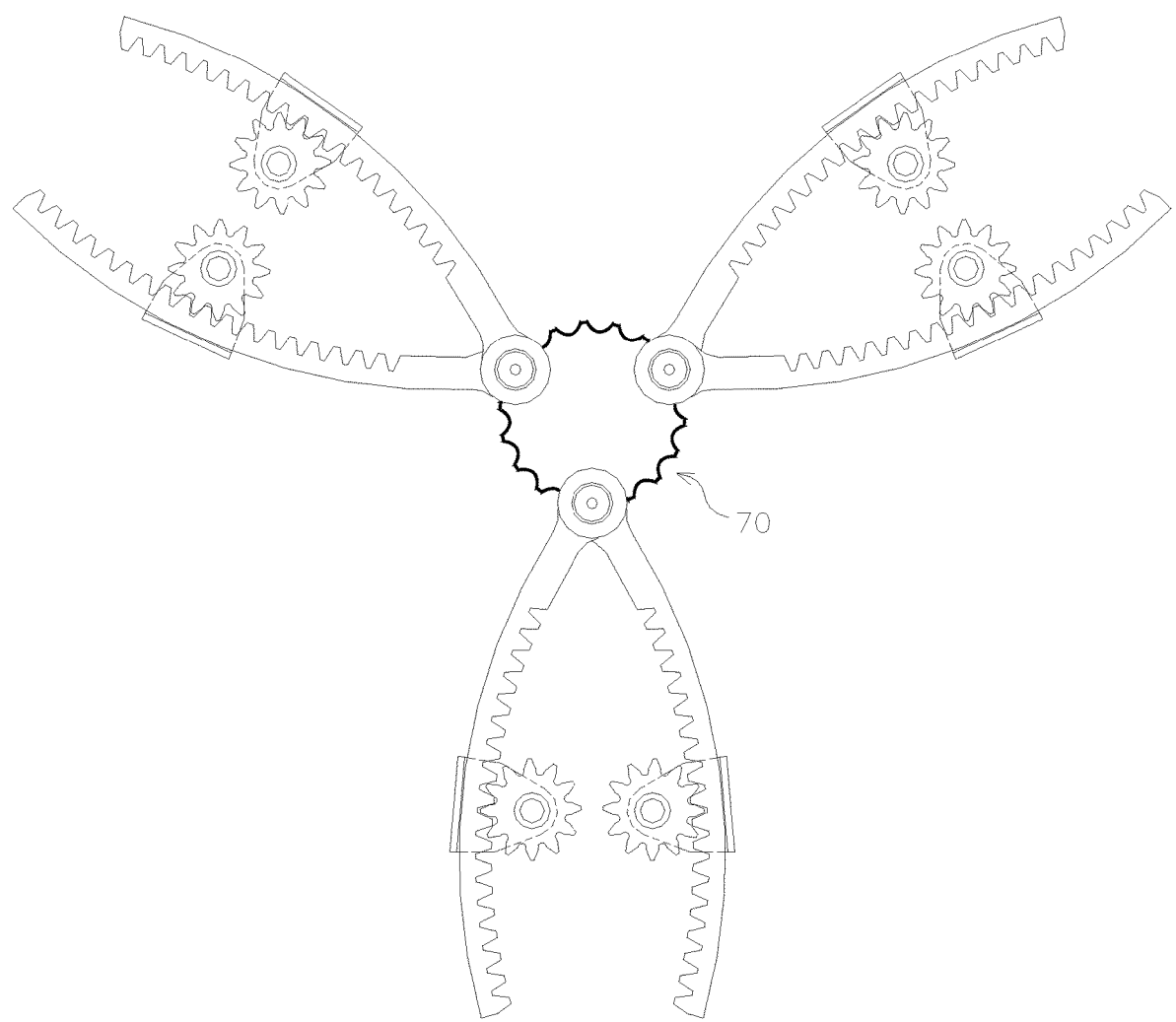
FIG. 7 is an example of utilizing a plurality of geared parallel manipulators of the SCARA type according to the present invention for the purpose of 3D printing using multiple extrusion heads.

FIG. 7 shows an arrangement where three geared parallel manipulators of the SCARA type according to the present invention are positioned relative to a common base, and perform a cooperative task, such as simultaneously 3D printing a model 70 using multiple extrusion heads. Similar arrangements of two or more geared parallel manipulators of the SCARA type according to this invention can be employed for concurrently laser or jet cutting, or for simultaneously performing milling or engraving with multiple spinning tools.

The examples of geared parallel manipulator of the SCARA type presented herein are illustrative rather than limitative, and a person having ordinary skill in the art may modify, adapt, and alter them within the scope and equivalence of the following claims:

What is claimed is:

1. A manipulator comprising:
a pair of racks comprising a first-rack and a second rack, wherein an end of the first-rack is joined with an end of the second-rack at a joint;
a first-pinion meshing with the first-rack and a second-pinion meshing with the second-rack; and
a first-motor driving the first-pinion and a second-motor diving the second-pinion;
wherein the rotational-positions of the first-pinion and the second-pinions determines the positions of the first-rack, the second-rack, and the joint;
wherein the manipulator is a geared parallel manipulator of the SCARA type in which the joint can be moved to cover a two-dimensional area by controlling the rotational-positions of the first pinion and the second-pinion;
wherein during the operation of the manipulator the first-rack remains in contact with the first-pinion and the second-rack remains in contact with the second pinion; and
wherein the geared parallel manipulator is configured to perform one or more of the following tasks: object manipulation, 3D printing, rapid prototyping, laser or jet cutting, engraving, end milling, pen plotting or as a microelectromechanical system (MEMS) application.

2. The manipulator according to claim 1, wherein the two racks are joined by a revolute joint of the pin-in-a-hole type.

3. The manipulator according to claim 1, wherein the first rack and the second rack are joined by a compliant joint of a flexure hinge type.

4. The manipulator according to claim 1, wherein meshing alignment between the first rack and the first pinion and between the second rack and the second pinion, respectively, is ensured by means of a guiding bracket that can pivot relative to a base.

5. The manipulator according to claim 2, wherein a tension spring or a compression spring is attached between the two racks to keep the racks in contact with their respective pinions.

6. The manipulator according to claim 3, wherein the flexure hinge generates, through its own elasticity, a force necessary to keep the first rack in contact with the first pinion and the second rack in contact with the second pinion.

7. The manipulator according to claim 1 wherein each rack of the pair of racks is maintained coplanar with its respective pinion by sandwiching each rack between two pair of disks that are solidly attached to the respective pinions,
wherein a diameter of the disks is larger than an addendum circle of the pinions.

8. The manipulator according to claim 1, wherein the first and second racks are maintained coplanar with the first and second pinions, respectively, by sandwiching them between a flat base and a fix plate that is mounted parallel to the flat base.

9. The geared parallel manipulator of the SCARA type according to claim 1, wherein the pair of racks and the pinions are fabricated through an extrusion process.

10. The manipulator according to claim 1, wherein the pair of racks and the pinions are fabricated through sheet-metal stamping.

11. The manipulator according to claim 1 configured as a microelectromechanical system (MEMS),
wherein the microelectromechanical system (MEMS) is manufactured using a thin film technology.

12. The manipulator according to claim 1, wherein at least one tine or prong extends from the first rack or the second rack, and
wherein the at least one tine or prong functions to position or manipulate objects.

13. Two or more manipulators according to the manipulator of claim 1,
wherein the two or more manipulators are geared parallel manipulators attached to a common base;
wherein the two or more geared parallel manipulators are configured to perform one or more of the following functions:
cooperative tasks;
positioning and manipulating objects;
three-dimensional printing using multiple lasers or extrusion heads; and
milling or engraving using multiple spinning tools.

* * * * *